(12) United States Patent
Titterington et al.

(10) Patent No.: US 9,732,241 B2
(45) Date of Patent: Aug. 15, 2017

(54) INKS COMPRISING GELLANTS FOR 3D PRINTING

(71) Applicant: 3D Systems, Incorporated, Rock Hill, SC (US)

(72) Inventors: Don Titterington, Wilsonville, OR (US); Patricia Wang, Lake Oswego, OR (US); Bo Wu, Wilsonville, OR (US)

(73) Assignee: 3D Systems, Inc., Rock Hill, SC (US)

( * ) Notice: Subject to any disclaimer, the term of this patent is extended or adjusted under 35 U.S.C. 154(b) by 245 days.

(21) Appl. No.: 14/730,841

(22) Filed: Jun. 4, 2015

(65) Prior Publication Data

US 2015/0353750 A1 Dec. 10, 2015

Related U.S. Application Data

(60) Provisional application No. 62/007,631, filed on Jun. 4, 2014.

(51) Int. Cl.
| | |
|---|---|
| *C09D 11/30* | (2014.01) |
| *C09D 133/14* | (2006.01) |
| *B33Y 70/00* | (2015.01) |
| *B29C 67/00* | (2017.01) |
| *C09D 11/101* | (2014.01) |
| *C09D 11/34* | (2014.01) |
| *C09D 11/38* | (2014.01) |
| *B29K 33/04* | (2006.01) |
| *B29K 75/00* | (2006.01) |
| *B33Y 10/00* | (2015.01) |

(52) U.S. Cl.
CPC .......... *C09D 11/30* (2013.01); *B29C 67/0059* (2013.01); *B33Y 70/00* (2014.12); *C09D 11/101* (2013.01); *C09D 11/34* (2013.01); *C09D 11/38* (2013.01); *C09D 133/14* (2013.01); *B29K 2033/04* (2013.01); *B29K 2075/00* (2013.01); *B33Y 10/00* (2014.12)

(58) Field of Classification Search
CPC ............ B29C 67/0059; B29K 2033/04; B29K 2075/00; C09D 11/101; C09D 11/30; C09D 11/34; C09D 11/38; C09D 133/14
USPC ....................................................... 264/308
See application file for complete search history.

(56) References Cited

FOREIGN PATENT DOCUMENTS

| | | |
|---|---|---|
| EP | 1458825 | 9/2004 |
| EP | 2256170 | 1/2010 |
| WO | 2014058539 | 4/2014 |

OTHER PUBLICATIONS

PCT International Search Report the International Searching Authority for PCT/US2015/034177, mailed Aug. 12, 2015 (4 pages).
PCT Written Opinion of the International Searching Authority for PCT/US2015/034177, mailed Aug. 12, 2015 (5 pages).

*Primary Examiner* — Leo B Tentoni (57) ABSTRACT

In one aspect, methods of printing a three-dimensional article are described herein. In some embodiments, a method described herein comprises jetting an ink at a temperature T1 onto a substrate at a temperature T2 to form a layer of the ink on the substrate. The method further comprises subsequently curing the layer of the ink. In some embodiments, T1 is greater than T2 and the ink in an uncured state has a liquid-gel transition temperature below T1 and above T2. Further, the layer of the ink is deposited on the substrate at a rate R1 in mg/s/in² that is within 60% of a gelation rate R2 of the ink in inverse minutes in an uncured state at T2. The ink can comprise a curable material and a gellant.

19 Claims, 2 Drawing Sheets

INKS COMPRISING GELLANTS FOR 3D PRINTING

CROSS REFERENCE TO RELATED APPLICATIONS

This application claims priority pursuant to 35 U.S.C. §119 to U.S. Provisional Patent Application Ser. No. 62/007,631, filed on Jun. 4, 2014, which is hereby incorporated by reference in its entirety.

FIELD

The present invention relates to inks and, in particular, to gellant-containing inks for use with three-dimensional (3D) printing systems.

BACKGROUND

Commercially available 3D printers, such as the ProJet™ 3D Printers manufactured by 3D Systems of Rock Hill, S.C., use inks, which are also known as build materials, that are jetted through a print head as a liquid to form various 3D objects or parts. Other 3D printing systems also use an ink that is jetted through a print head. In some instances, the ink is solid at ambient temperatures and converts to liquid at elevated jetting temperatures. In other instances, the ink is liquid at ambient temperatures.

To form printed articles, some inks require curing following jetting and deposition of the ink on a surface. Curing can be an exothermic process, and the release of thermal energy during curing can limit the printing speed. In particular, printing and curing ink layers too quickly can result in elevated temperatures at the deposition surface, which can in turn lead to a reduced viscosity of the deposited ink and a concomitant loss of printing resolution due to excessive flow of the ink. In addition, some inks that exhibit high viscosities at ambient temperatures also exhibit phase segregation of ink components over time, including during storage of the ink and/or after the ink is formed into a printed article. For example, in some instances, a pigment and/or a wax component of the ink undergoes settling and/or phase segregation.

Therefore, there exists a need for improved inks for 3D printing, including for rapid and/or pigmented 3D printing applications.

SUMMARY

In one aspect, inks for use with a 3D printer are described herein which, in some embodiments, may offer one or more advantages over prior inks. In some embodiments, for example, an ink described herein can be used to provide printed articles at a higher print speed and/or with a higher feature resolution. Moreover, in some instances, a specific ink described herein can be matched to a specific desired print speed to obtain a printed article having a high feature resolution and high mechanical strength. An ink described herein, in some cases, can also exhibit reduced phase segregation of ink components during storage and/or after curing of the ink to form a printed article. In some instances, an ink described herein, when cured, can consist essentially of a single phase or of no more than two phases. Additionally, an ink described herein, when pigmented, can provide reduced color-to-color diffusion or "bleed" between adjacent voxels of differing colors.

In some embodiments, an ink for use in a 3D printing system described herein comprises a curable material and a gellant. The gellant can comprise a chemical species having one or more terminal olefin moieties linked to a hydrophobic segment by one or more urethane moieties. In some instances, the one or more urethane moieties directly link the hydrophobic segment to the one or more terminal olefin moieties. In other cases, the one or more urethane moieties indirectly link the hydrophobic segment to the one or more terminal olefin moieties. For example, in some instances, the gellant chemical species further comprises one or more additional hydrophobic segments disposed between the one or more urethane moieties and the one or more terminal olefin moieties. Additionally, in some embodiments, the urethane moieties of a gellant chemical species described herein can be at least partially replaced by a different nitrogen-containing functional group, such as a urea and/or amide moiety. Further, in some cases, the chemical species is a dimer.

Moreover, in some embodiments, an ink described herein further comprises a colorant, such as a molecular dye, a particulate inorganic pigment, or a particulate organic colorant. An ink described herein may also comprise one or more additives selected from the group consisting of photoinitiators, inhibitors, stabilizing agents, sensitizers, and combinations thereof.

In addition, in some embodiments, an ink described herein is a gel at 20-30° C. Further, in some such cases, the ink exhibits a liquid-gel transition between about 40° C. and about 75° C., between about 45° C. and about 65° C., or between about 45° C. and about 60° C. Additionally, the heat of fusion of the liquid-gel transition can be about 20 J/g or less, about 15 J/g or less, or about 10 J/g or less. In some cases, the heat of fusion of the liquid-gel transition can be about 7 J/g or less, about 5 J/g or less, or about 3 J/g or less.

In another aspect, methods of printing a 3D article are described herein. In some embodiments, a method of printing a 3D article comprises selectively depositing layers of an ink described herein in a fluid state onto a substrate. For example, in some cases, the ink comprises a curable material and a gellant, wherein the gellant comprises a chemical species having one or more terminal olefin moieties linked to a hydrophobic segment by one or more urethane, urea, and/or amide moieties. Further, the layers of the ink can be deposited according to an image of the 3D article in a computer readable format. Moreover, in some cases, one or more layers of an ink described herein has a thickness of about 0.03 to about 5 mm. In addition, in some embodiments, a method described herein further comprises supporting at least one of the layers of the ink with a support material. A method described herein can also comprise curing the layers of the ink.

Further, in some cases, a method of printing a 3D article described herein comprises forming a layer of an ink described herein in a manner that matches or substantially matches the print speed or deposition rate to a gelation time or gelation rate of the ink. For example, in some instances, a method of printing comprises jetting an ink described herein at a temperature T1 onto a substrate at a temperature T2 to form a layer of the ink on the substrate. The method further comprises subsequently curing the layer of the ink. In some such embodiments, T1 is greater than T2, and the ink in an uncured state has a liquid-gel transition temperature below T1 and above T2. Further, the layer of the ink can be deposited on the substrate at a rate R1 (in mg/s per in$^2$) that is within about 60% or within about 40% of a gelation rate R2 of the ink (in inverse minutes) in an uncured state at T2. Additionally, in some cases, a gelation time GT of the ink in an uncured state at T2 is no greater than about 45 minutes, no greater than about 30 minutes, or no greater than about 14 minutes.

In another aspect, printed 3D articles are described herein. In some embodiments, a printed 3D article is formed from an ink described herein, such as an ink comprising a curable material and a gellant, wherein the gellant comprises a chemical species having one or more terminal olefin moieties linked to a hydrophobic segment by one or more urethane, urea, and/or amide moieties.

These and other embodiments are described in greater detail in the detailed description which follows.

DETAILED DESCRIPTION

Embodiments described herein can be understood more readily by reference to the following detailed description, examples, and drawings. Elements, apparatus and methods described herein, however, are not limited to the specific embodiments presented in the detailed description, examples, and drawings. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other techniques now known in the art or that may be known in the future that use a build material or ink to fabricate three-dimensional objects.

I. Inks for 3D Printing

In one aspect, inks for use with a 3D printer are described herein. In some embodiments, an ink described herein comprises a curable material and a gellant. The gellant of an ink described herein, in some cases, comprises a curable species such as an ethylenically unsaturated species. The gellant may also comprise one or more nitrogen-containing moieties capable of participating in hydrogen bonding, such as one or more urethane, urea, and/or amide moieties. Additionally, in some embodiments, the gellant of an ink described herein can comprise a chemical species having one or more hydrophobic segments. For example, in some instances, a gellant comprises a chemical species having one or more terminal olefin moieties linked to a hydrophobic segment by one or more urethane moieties. In some such cases, the one or more urethane moieties directly link the hydrophobic segment to the one or more terminal olefin moieties. In other instances, the one or more urethane moieties indirectly link the hydrophobic segment to the one or more terminal olefin moieties. In some embodiments, for example, the gellant chemical species further comprises one or more additional hydrophobic segments disposed between the one or more urethane moieties and the one or more terminal olefin moieties. Moreover, in some embodiments, the chemical species is a dimer.

The gellant of an ink described herein can permit the ink to have a gel state at temperatures below the jetting temperature of the ink and/or at ambient temperatures. For example, in some cases, an ink described herein is a gel at a temperature of 20-30° C., such as 25° C., including at standard atmospheric pressure (1 atm). In some embodiments, an ink described herein is a gel at a temperature below about 70° C., below about 60° C., below about 50° C., or below about 40° C. Moreover, a gel, in some cases, comprises, consists, or consists essentially of a non-fluid network that is expanded throughout its whole volume by a fluid. A gel may also comprise, consist, or consist essentially of a substantially fluid phase dispersed in a substantially non-fluid phase. For example, in some embodiments, an ink described herein can be a gel comprising a network formed by the gellant of the ink. Further, at least a portion of the curable material of the ink can be dispersed in the network. Additionally, in some cases, a gel described herein exhibits no flow when in the steady-state, including a specific temperature. Further, in some instances, a gel described herein is not a covalent gel.

Moreover, in some cases, a gel described herein has a dynamic shear viscosity of at least about 100 centipoise (cP), at least about 200 cP, at least about 500 cP, at least about 1000 cP, at least about 2000 cP, at least about 3000 cP, at least about 5000 cP, or at least about 10,000 cP at a temperature of 20-30° C. when measured as described hereinbelow in the specific examples. In some embodiments, a gel described herein has a dynamic shear viscosity between about 100 cP and about 20,000 cP, between about 100 cP and about 10,000 cP, between about 500 cP and about 20,000 cP, between about 500 cP and about 5,000 cP, between about 1000 cP and about 20,000 cP, between about 1000 cP and about 10,000 cP, between about 2000 cP and about 20,000 cP, between about 2000 cP and about 10,000 cP, between about 3000 cP and about 20,000 cP, between about 3000 cP and about 10,000 cP, between about 5000 cP and about 20,000 cP, or between about 5000 cP and about 10,000 cP at a temperature of 20-30° C.

Additionally, in some embodiments, an ink described herein exhibits a liquid-gel transition temperature or melting point between about 30° C. and about 75° C. In some cases, the ink exhibits a liquid-gel transition temperature or melting point between about 40° C. and about 50° C., between about 45° C. and about 70° C., between about 45° C. and about 65° C., or between about 45° C. and about 60° C. Moreover, in some embodiments, the liquid-gel transition temperature or melting point is a sharp liquid-gel transition temperature or melting point. For example, in some instances, an ink makes a liquid-gel transition over a temperature range of X±10° C. or X±5° C., where X is the temperature at which the transition is centered (e.g., X=55° C.). In other cases, an ink makes a liquid-gel transition over a temperature range of X±20° C. or X±15° C. Further, the liquid-gel transition temperature of an ink described herein can correspond to a measured temperature at the gelation time of the ink, as described further hereinbelow in Section II. The liquid-gel transition temperature can also be determined based on step-function change in viscosity of the ink, as described further hereinbelow in Example 5.

Further, in some cases, an ink described herein has a low heat of fusion. For example, in some embodiments, the heat of fusion of a liquid-gel transition described herein is about 20 J/g or less, about 15 J/g or less, or about 10 J/g or less. In some cases, the heat of fusion of the liquid-gel transition is about 7 J/g or less, about 6 J/g or less, about 5 J/g or less, about 4 J/g or less, about 3 J/g or less, or about 2 J/g or less. In some embodiments, the heat of fusion of the liquid-gel transition is between about 0.5 J/g and about 20 J/g, between about 1 J/g and about 15 J/g, between about 5 J/g and about 10 J/g, between about 0.5 J/g and about 7 J/g, between about 1 J/g and about 5 J/g, or between about 1 J/g and about 3 J/g.

Additionally, an ink described herein, in some embodiments, is fluid at jetting temperatures encountered in 3D printing systems. Moreover, in some instances, an ink solidifies or becomes a gel once deposited on a surface during the fabrication of a 3D article or object. Alternatively, in other cases, an ink remains substantially fluid upon deposition on a surface. Further, an ink described herein can have a viscosity profile consistent with the requirements and parameters of one or more 3D printing systems. In some embodiments, for example, an ink described herein has a viscosity ranging from about 8.0 cP to about 14.0 cP, from about 9.5 cP to about 12.5 cP, or from about 10.5 cP to about 12.5 cP at a temperature of about 80° C. when measured according to ASTM standard D2983 (e.g., using a Brookfield Model DV-II+ Viscometer). In some embodiments, an ink has a viscosity ranging from about 8.0 cP to about 10.0 cP at a temperature of about 85-87° C. An ink descried herein, in some cases, has a viscosity ranging from about 8.0 cP to about 19.0 cP, from about 8.0 cP to about 13.5 cP, from about 11.0 cP to about 14.0 cP, from about 11.5 cP to about 13.5 cP, or from about 12.0 cP to about 13.0 cP at a temperature of about 65° C. when measured according to ASTM standard D2983.

Additionally, an ink described herein, in some embodiments, further comprises a colorant, such as a molecular dye, a particulate inorganic pigment, or a particulate organic colorant. An ink described herein may also comprise one or more additives selected from the group consisting of photoinitiators, inhibitors, stabilizing agents, sensitizers, and combinations thereof.

Further, in some embodiments, an ink described herein can have a high optical transparency, including in the visible region of the electromagnetic spectrum. In some cases, for instance, the ink has an optical transparency of at least about 70%, at least about 80%, at least about 90%, at least about 95%, at least about 98%, or at least about 99% transmission between about 350 nm and about 750 nm, at a given thickness, such as a thickness of about 0.01 to 10 mm, about 0.03 to 10 mm, 0.05 to 10 mm, 0.1 to 10 mm, 0.3 to 0.8 mm, 0.5 to 10 mm, 1 to 10 mm, or 5 to 10 mm. In some cases, an ink described herein has an optical transparency between about 70% and about 95%, between about 80% and about 99.99%, or between about 90% and about 95% transmission at wavelengths between about 350 nm and about 750 nm, at a given thickness, such as a thickness described above. Inks having an optical transparency described herein can facilitate use of the inks in 3D printing colorization processes wherein the perceived color of a printed 3D article is based on the dithering of discrete colors in the z-direction of the part, which is orthogonal to the surface of the article, rather than in the x- and y-directions along the surface of the article.

Turning now to specific components of inks, inks described herein comprise a curable material. The curable material can be present in the ink in any amount not inconsistent with the objectives of the present disclosure. In some cases, the curable material is present in an amount up to about 99 weight %, up to about 95 weight %, up to about 90 weight %, or up to about 80 weight %, based on the total weight of the ink. In some cases, an ink described herein comprises about 10-95 weight % curable material, based on the total weight of the ink. In some embodiments, an ink comprises about 20-80 weight % curable material, about 30-70 weight % curable material, or about 70-90 weight % curable material.

Moreover, any curable material not inconsistent with the objectives of the present disclosure may be used. In some cases, a curable material comprises one or more polymerizable components. A "polymerizable component," for reference purposes herein, comprises a component that can be polymerized or cured to provide a printed 3D article or object. Polymerizing or curing can be carried out in any manner not inconsistent with the objectives of the present disclosure. In some embodiments, for instance, polymerizing or curing comprises irradiating with electromagnetic radiation having sufficient energy to initiate a polymerization or cross-linking reaction. For instance, in some cases, ultraviolet (UV) radiation can be used.

Further, any polymerizable component not inconsistent with the objectives of the present disclosure may be used. In some embodiments, a polymerizable component comprises a monomeric chemical species, such as a chemical species having one or more functional groups or moieties that can react with the same or different functional groups or moieties of another monomeric chemical species to form one or more covalent bonds, such as in a polymerization reaction. A polymerization reaction, in some cases, comprises a free radical polymerization, such as that between points of unsaturation, including points of ethylenic unsaturation. In some embodiments, a polymerizable component comprises at least one ethylenically unsaturated moiety, such as a vinyl group or allyl group. In some cases, a polymerizable component comprises an oligomeric chemical species capable of undergoing additional polymerization, such as through one or more points of unsaturation as described herein. In some embodiments, a polymerizable component comprises one or more monomeric chemical species and one or more oligomeric chemical species described herein. A monomeric chemical species and/or an oligomeric chemical species described herein can have one polymerizable moiety or a plurality of polymerizable moieties. For example, in some instances, a polymerizable component comprises one, two, or three ethylenically unsaturated moieties.

Further, in some cases, a polymerizable component comprises one or more photo-polymerizable or photo-curable chemical species. A photo-polymerizable chemical species, in some embodiments, comprises an ultraviolet- or UV-polymerizable chemical species. In some instances, a polymerizable component is photo-polymerizable or photo-curable at wavelengths ranging from about 300 nm to about 400 nm. Alternatively, in other cases, a polymerizable component is photo-polymerizable at visible wavelengths of the electromagnetic spectrum.

In some embodiments, a polymerizable component described herein comprises one or more species of (meth) acrylates. As used herein, the term "(meth)acrylate" includes acrylate or methacrylate or mixtures or combinations thereof. In some cases, a polymerizable component comprises an aliphatic polyester urethane acrylate oligomer, a urethane(meth)acrylate resin, and/or an acrylate amine oligomeric resin, such as EBECRYL 7100. In some instances, a UV polymerizable or curable resin or oligomer can comprise any methacrylate or acrylate resin which polymerizes in the presence of a free radical photoinitiator, is thermally stable in an exposed state for at least one week at the jetting temperature of the ink and for at least 4 weeks in an enclosed state, and/or has a boiling point greater than the jetting temperature. In some embodiments, a polymerizable component has a flash point above the jetting temperature.

Urethane(meth)acrylates suitable for use in inks described herein, in some cases, can be prepared in a known manner, typically by reacting a hydroxyl-terminated urethane with acrylic acid or methacrylic acid to give the corresponding urethane(meth)acrylate, or by reacting an isocyanate-terminated prepolymer with hydroxyalkyl acrylates or methacrylates to give the urethane(meth)acrylate. Suitable processes are disclosed, inter alia, in EP-A 114 982 and EP-A 133 908. The weight average molecular weight of such (meth)acrylate oligomers, in some cases, can be from about 400 to 10,000 or from about 500 to 7,000. Urethane(meth)acrylates are also commercially available from the SARTOMER Company under the product names CN980, CN981, CN975 and CN2901, or from Bomar Specialties Co. (Winsted, Conn.) under the product name BR-741. In some embodiments described herein, a urethane(meth)acrylate oligomer has a viscosity ranging from about 140,000 cP to about 160,000 cP at about 50° C. or from about 125,000 cP to about 175,000 cP at about 50° C. when measured in a manner consistent with ASTM D2983. In some cases described herein, a urethane(meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

In addition, in some cases, a polymerizable component comprises one or more low molecular weight materials, such as (meth)acrylates, di(meth)acrylates, and tri(meth)acrylates, which can be used in a variety of combinations. In some embodiments, for example, a polymerizable component comprises one or more of tetrahydrofurfuryl methacrylate, triethylene glycol dimethacrylate, 2-phenoxyethyl methacrylate, lauryl methacrylate, ethoxylated trimethylolpropane triacrylate, tricyclodecane dimethanol diacrylate, 2-phenoxyethylacrylate, triethylene glycol diacrylate, a monofunctional aliphatic urethane acrylate, polypropylene glycol monomethacrylate, polyethylene glycol monomethacrylate, cyclohexane dimethanol diacrylate, and tridecyl methacrylate.

Further, in some embodiments, a polymerizable component comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis (4-hydroxycyclohexyl)propane or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

As described hereinabove, a polymerizable component, in some cases, comprises one or more tri(meth)acrylates. In some embodiments, tri(meth)acrylates comprise 1,1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate, or tris(2-hydroxy ethyl) isocyanurate triacrylate.

In some embodiments, a polymerizable component of an ink described herein comprises one or more higher functional acrylates or methacrylates such as dipentaerythritol monohydroxy pentaacrylate or bis(trimethylolpropane)tetraacrylate. In some embodiments, a (meth)acrylate of an ink described herein has a molecular weight ranging from about 250 to 700.

In some cases, a polymerizable component comprises allyl acrylate, allyl methacrylate, methyl(meth)acrylate, ethyl(meth)acrylate, n-propyl(meth)acrylate, n-butyl(meth) acrylate, isobutyl(meth)acrylate, n-hexyl(meth)acrylate, 2-ethylhexyl(meth)acrylate, n-octyl(meth)acrylate, n-decyl (meth)acrylate and n-dodecyl(meth)acrylate, 2-hydroxyethyl(meth)acrylate, 2- and 3-hydroxypropyl(meth)acrylate, 2-methoxyethyl(meth)acrylate, 2-ethoxyethyl(meth)acrylate, 2- or 3-ethoxypropyl(meth)acrylate, tetrahydrofurfuryl methacrylate, 2-(2-ethoxyethoxy)ethyl acrylate, cyclohexyl methacrylate, 2-phenoxyethyl acrylate, glycidyl acrylate, isodecyl acrylate, or a combination thereof.

Additional non-limiting examples of species of polymerizable components useful in some embodiments described herein include the following: isobornyl acrylate (IBOA), commercially available from SARTOMER under the trade name SR 506A; isobornyl methacrylate, commercially available from SARTOMER under the trade name SR 423A; alkoxylated tetrahydrofurfuryl acrylate, commercially available from SARTOMER under the trade name SR 611; monofunctional urethane acrylate, commercially available from RAHN USA under the trade name GENOMER 1122; aliphatic urethane diacrylate, commercially available from ALLNEX under the trade name EBECRYL 8402; triethylene glycol diacrylate, commercially available from SARTOMER under the trade name SR 272; and triethylene glycol dimethacrylate, commercially available from SARTOMER under the trade name SR 205; tricyclodecane dimethanol diacrylate, commercially available from SARTOMER under the trade name SR 833S; tris(2-hydroxy ethyl)isocyanurate triacrylate, commercially available from SARTOMER under the trade name SR 368; and 2-phenoxyethyl acrylate, commercially available from SARTOMER under the trade name SR 339. Other commercially available curable materials may also be used.

Inks described herein also comprise a gellant. The gellant of an ink described herein, in some cases, comprises a curable species such as an ethylenically unsaturated species. For example, in some embodiments, a gellant comprises a chemical species having one or more olefin moieties, including one or more terminal olefin moieties. A terminal olefin moiety, in some embodiments, comprises an allyl moiety or a (meth)acrylate moiety. In other instances, a terminal olefin moiety comprises a vinyl moiety. However, in some embodiments, a gellant of an ink described herein does not comprise a vinyl ether moiety.

Further, in some cases, a gellant of an ink described herein comprises a chemical species having a plurality of terminal olefin moieties. Moreover, in some instances, the chemical species comprises a dimer, and each monomeric subunit of the dimer comprises at least one terminal olefin moiety. The use of a gellant comprising a curable species described herein, in some cases, can permit the gellant to be covalently bonded to one or more other components of an ink described herein, such as a curable material of the ink. In this manner, a gellant described herein may not phase segregate or substantially phase segregate from the cured ink. Thus, in some embodiments, an ink described herein when cured can consist essentially of a single phase.

A gellant of an ink described herein can also comprise one or more nitrogen-containing moieties capable of participating in hydrogen bonding. For example, in some embodiments, a gellant described herein comprises a chemical species having one or more urethane, urea, and/or amide moieties. In some cases, the chemical species comprises a plurality of urethane, urea, and/or amide moieties. The use of a gellant comprising such a chemical species may, in some embodiments, facilitate the formation of a gel phase of the ink at ambient temperatures, such as temperatures of 20-30° C., including when the curable material of the ink comprises one or more urethane-containing species.

Additionally, in some embodiments, the gellant of an ink described herein can comprise a chemical species having one or more hydrophobic segments. Any hydrophobic segment not inconsistent with the objectives of the present disclosure may be used. In some cases, the hydrophobic segment comprises a hydrocarbon segment. A hydrocarbon segment, in some instances, comprises 6 to 50 carbon atoms. Additionally, a hydrophobic segment can comprise an aliphatic or an aromatic hydrocarbon segment. In some cases, for example, the hydrophobic segment comprises an alkyl, alkenyl, or aryl moiety. Moreover, in some embodiments, a hydrocarbon segment comprises a linear hydrocarbon moiety, such as a linear alkyl or alkenyl moiety. In other cases, a hydrocarbon segment comprises a cyclic or branched hydrocarbon moiety, such as an aryl moiety. Further, in some cases, a branched hydrocarbon segment comprises a dimeric species such as an alkyl moiety provided by a PRIPOL 2033 dimer diol or PRIPOL 1009 dimer acid mixture available from Uniqema (New Castle, Del.).

A hydrocarbon segment of a gellant described herein can also be a saturated alkyl moiety. Such a saturated alkyl moiety, in some instances, comprises 2-36 carbon atoms. Moreover, the saturated alkyl moiety can be linear or branched. In some embodiments, a saturated alkyl moiety comprises 8-30 carbon atoms, 10-28 carbon atoms, or 10-20 carbon atoms. In other embodiments, a saturated alkyl moiety comprises 12-26 carbon atoms, 14-24 carbon atoms, or 14-20 carbon atoms. Additionally, in some cases, a saturated alkyl moiety comprises an octyl, nonyl, decyl, or undecyl moiety. In other embodiments, a saturated alkyl moiety comprises a dodecyl, tridecyl, tetradecyl, pentadecyl, hexadecyl, heptadecyl, octadecyl, nonadecyl, or eicosyl moiety.

In addition, a hydrophobic segment of a gellant chemical species described herein is not limited to a hydrocarbon moiety described herein. Other hydrophobic segments may also be included in a gellant chemical species described herein. For example, in some cases, a hydrophobic segment of a chemical species described herein comprises a hydrophobic organic polymer or oligomer such as a hydrophobic acrylic, amide, imide, carbonate, ester, ether, halocarbon, pyridine, or pyrrolidone polymer or oligomer. Further, the melting point of a gellant chemical species and/or the gelling point of an ink described herein can, in some cases, be selected based on the chemical identity and/or size of the hydrophobic segment of the gellant chemical species, as described further hereinbelow.

As described herein, a gellant can comprise a chemical species having one or more terminal olefin moieties described herein linked to a hydrophobic segment described herein by one or more urethane, urea, and/or amide moieties. In some cases, the one or more urethane, urea, and/or amide moieties directly link the hydrophobic segment to the one or more terminal olefin moieties. In other instances, the one or more urethane, urea, and/or amide moieties indirectly link the hydrophobic segment to the one or more terminal olefin moieties. In some embodiments, for example, the gellant chemical species further comprises one or more additional hydrophobic segments disposed between the one or more urethane, urea, and/or amide moieties and the one or more terminal olefin moieties. Moreover, in some cases, it is also possible for a gellant to include an ester or carbonate ester linkage or moiety in place of a urethane, urea, and/or amide moiety described above.

The use of a gellant comprising one or more hydrophobic segments described herein, in some embodiments, can permit the gellant to be partially or fully miscible with one or more other components of the ink, such as one or more oligomeric curable species that may be present in the ink.

Moreover, in some cases, the chemical species of a gellant described herein comprises a plurality of terminal olefin moieties linked to a hydrophobic segment by the one or more urethane, urea, and/or amide moieties. In other embodiments, the chemical species can comprise a plurality of urethane, urea, and/or amide moieties linking one or more terminal olefin moieties to a hydrophobic segment described herein. Moreover, in some instances, the chemical species comprises a plurality of terminal olefin moieties linked to a hydrophobic segment by a plurality of urethane, urea, and/or amide moieties.

In some embodiments, the gellant of an ink described herein is formed from the reaction of compound (A) with compound (B) and compound (C):

(A) OCN—R$_1$—NCO, (B) HO—R$_2$—OH, and (C)

wherein R$_1$, R$_2$, and R$_3$ are each independently a linear or branched alkyl, aryl, alkylaryl, or arylalkyl moiety having from 1 to 50 carbon atoms or 1 to 30 carbon atoms; R$_4$ is —H or —CH$_3$; and

X is —O—, —OCH$_2$—, —OC(O)—, or —CH$_2$—.

For example, in some cases, R$_1$ is a dimethylene, trimethylene, tetramethylene, pentamethylene, or hexamethylenene moiety. In other cases, R$_1$ is a branched alkyl moiety having from 4 to 16 carbon atoms. In some embodiments, R$_2$ is a dimer diol, such as a C18-C40 dimer diol. One non-limiting example of a dimer diol suitable for use in some embodiments described herein is PRIPOL 2033 dimer diol from Uniqema. The use of such a dimer diol, in some cases, can provide a dimeric gellant chemical species, as described further hereinbelow. Further, in some embodiments, $R_3$ is a dimethylene, trimethylene, tetramethylene, pentamethylene, or hexamethylenene moiety. In other cases, $R_3$ is a branched alkyl moiety having from 4 to 16 carbon atoms. In general, $R_1$, $R_2$, and $R_3$ can be selected to obtain a gellant chemical species having a desired melting point and/or to obtain an ink having a desired liquid-gel transition temperature. For example, selecting $R_3$ to be a shorter and/or more highly branched alkyl moiety can provide an ink having a lower liquid-gel transition temperature.

Compounds (A), (B), and (C) can be reacted in any molar ratios or equivalents not inconsistent with the objectives of the present disclosure to form a gellant described herein. In some cases, for instance, a gellant is formed from an excess of compound (A) and/or compound (C) compared to compound (B). In some embodiments, a gellant is formed from 2 equivalents of compound (A), 1 equivalent of compound (B), and 2 equivalents of compound (C). Further, in some embodiments, a reaction product of compounds (A), (B), and (C) is not a polymer or oligomer. Additionally, in some cases, a gellant described herein comprises a mixture of products formed from the reaction of desired amounts of compounds (A), (B), and (C). In some such instances, the mixture of products is a statistical mixture of products. In some embodiments, the distribution of reaction products in a mixture described herein is thermodynamically controlled. In other cases, the distribution of reaction products in a mixture is kinetically controlled.

In some embodiments, the gellant of an ink described herein comprises a chemical species having the structure of Formula (I):

(I)

wherein $R_1$, $R_2$, and $R_3$ are each independently a linear or branched alkyl, aryl, alkylaryl, or arylalkyl moiety having from 1 to 30 carbon atoms; $R_4$ is —H or —CH$_3$; X is —O—, —OCH$_2$—, —OC(O)—, or —CH$_2$—; and 〈 represents a single carbon-carbon bond between the $R_2$ moieties.

In some embodiments, $R_1$ is —(CH$_2$)$_n$—, wherein n is an integer between 2 and 10; $R_2$ is —(CH$_2$)$_m$—, wherein m is an integer between 8 and 22; $R_3$ is —(CH$_2$)$_p$—, wherein p is an integer between 2 and 6; X is —O—; and the single carbon-carbon bond between the $R_2$ moieties occurs between the fourth carbon and the fourteenth carbon of an $R_2$ moiety. For example, in some instances, the gellant comprises a chemical species having the structure of Formula (II):

(II)

Moreover, in some embodiments, one or more urethane moieties of a specific gellant chemical species described herein can be at least partially replaced with a different nitrogen-containing moiety that can participate in hydrogen bonding. For example, in some cases, one or more urethane moieties of a chemical species described herein is replaced with a urea or amide moiety. In some embodiments, for instance, compound (C) above can be at least partially replaced with compound (C'):

(C')

wherein $R_3$ is as described above, such that a urea linkage is provided in the gellant chemical species. Similarly, it is also possible to at least partially replace compound (A) above with a monoisocyanate such as compound (A'):

$R_1$—NCO     (A'), wherein $R_1$ is as described above. In some such embodiments, compound (A') can be reacted with compound (C) or compound (C') without compound (B). In this manner, a gellant comprising a vinyl moiety and a urethane linkage or a urea linkage can be provided. Further, in some cases, compound (B) above can be at least partially replaced with compound (B'):

$R_2$—OH     (B'), wherein $R_2$ is as described above.

Thus, in some cases, the gellant of an ink described herein is formed from (1) the reaction of compound (A) or (A') with compound (C) or (C') and/or from (2) the reaction of compound (A) or (A') with compound (B) or (B') and with compound (C) or (C'):

OCN—$R_1$—NCO,     (A)

$R_1$—NCO     (A')

HO—$R_2$—OH,     (B)

$R_2$—OH,     (B')

(C)

(C')

wherein $R_1$, $R_2$, and $R_3$ are each independently a linear or branched alkyl, aryl, alkylaryl, or arylalkyl moiety having from 1 to 50, 1 to 30, 1 to 20, or 1 to 10 carbon atoms; $R_4$ is —H or —CH$_3$; and X is —O—, —OCH$_2$—, —OC(O)—, or —CH$_2$—. For example, in some cases, compound (B') is a fatty alcohol having 8 to 22 or 8 to 16 carbon atoms. Similarly, in some instances, compound (C) is a monoalcohol terminated with a vinyl group, allyl group, or (meth)acrylate group.

In some embodiments, the gellant of an ink described herein is formed from the reaction of compound (A) with compound (C). Further, in other instances, the gellant of an ink described herein is formed from the reaction of compound (A) with compound (B') and with compound (C). In some such instances, $R_2$ comprises a linear alkyl moiety described above (such that compound (B') is a fatty alcohol, for instance), and X is —OC(O)—(such that compound (C) is an acrylate-terminated or methacrylate-terminated alcohol, for instance).

Compounds (A) or (A'), (B) or (B'), and (C) or (C') can be reacted in any molar ratios or equivalents not inconsistent with the objectives of the present disclosure to form a gellant described herein. In some cases, for instance, a gellant is formed from approximately equal molar amounts of compound (B') and compound (C). For example, in some embodiments, the gellant is formed from the reaction of compounds (A), (B'), and (C) in a molar ratio of a:b:c, wherein a is 1, and b and c are each independently 0.4 to 0.6. Further, in some embodiments, a reaction product of compounds (A) or (A'), (B) or (B'), and (C) or (C') is not a polymer or oligomer.

Additionally, it is to be understood that the compounds (A) or (A'), (B) or (B'), and (C) or (C') can be reacted with one another to form a gellant in any manner not inconsistent with the objectives of the present disclosure. For example, in some cases, the compounds are reacted with one another simultaneously, such as may be achieved by adding all of the reactant compounds to a single reaction vessel. Alternatively, in other instances, the compounds can be reacted in a "stepwise" manner, such as may be achieved by first reacting compound (A) or (A') with compound (B) or (B') to form a reaction product, and then reacting the reaction product with compound (C) or (C'). A stepwise reaction may also comprise first reacting compound (A) or (A') with compound (C) or (C') to form a reaction product, and then reacting the reaction product with compound (B) or (B').

Further, in some cases, a gellant described herein comprises a mixture of products formed from the reaction of desired amounts of compounds (A) or (A'), (B) or (B'), and (C) or (C'). In some such instances, the mixture of products is a statistical mixture of products. In some embodiments, the distribution of reaction products in a mixture described herein is thermodynamically controlled. In other cases, the distribution of reaction products in a mixture is kinetically controlled. For example, in some instances, the reaction products include a statistical distribution of products, such as products wherein one molecule of compound (A) reacts with one molecule of compound (B') and one molecule of compound (C) to form a species including two urethane linkages, one hydrocarbon terminus, and one ethylenically unsaturated terminus (such as a vinyl, allyl, or (meth)acrylate terminus). Such products could also include a species having two urethane linkages and two hydrocarbon terminuses or two ethylenically unsaturated terminuses.

In some cases, the gellant of an ink described herein comprises a chemical species having the structure of Formula (III):

wherein $R_1$, $R_2$, and $R_3$ are each independently a linear or branched alkyl, aryl, alkylaryl, or arylalkyl moiety having from 1 to 50, 1 to 30, 1 to 20, or 1 to 10 carbon atoms; $R_4$ is —H or —CH$_3$; and

X is —O—, —OCH$_2$—, —OC(O)—, or —CH$_2$—. For example, in some cases, $R_1$ is a linear alkyl moiety having 4 to 8 carbon atoms, $R_2$ is a linear alkyl moiety having 8 to 18 carbon atoms, $R_3$ is a linear alkyl moiety having 2 to 4 carbon atoms, and X is —OC(O)—.

Further, in some embodiments, a gellant of an ink described herein is formed from the reaction of compound (A) with compound (B") and with compound (C) or (C'):

wherein $R_1$ and $R_3$ are each independently a linear or branched alkyl, aryl, alkylaryl, or arylalkyl moiety having from 1 to 50, 1 to 30, 1 to 20, or 1 to 10 carbon atoms; $R_4$ is —H or —CH$_3$; $R_5$ is —H or a linear or branched alkyl, aryl, alkylaryl, or arylalkyl moiety having from 1 to 50, 1 to 30, 1 to 20, or 1 to 10 carbon atoms; $R_6$, $R_7$, and $R_8$ are each independently a linear or branched alkyl, aryl, alkylaryl, arylalkyl, alkylene oxide moiety, or alkyl alkylene oxide moiety having from 1 to 50, 1 to 30, 1 to 20, or 1 to 10 carbon atoms; and X is —O—, —OCH$_2$—, —OC(O)—, or —CH$_2$—. For example, in some cases, compound (B") is a triol in which $R_6$, $R_7$, and $R_8$ are each independently an ethylene oxide (EO) or propylene oxide (PO) repeating unit, or an EO or PO repeating unit bonded to a methylene or propylene group. Similarly, in some instances, compound (C) is a monoalcohol terminated with a vinyl group, allyl group, or (meth)acrylate group.

Thus, in some cases, a gellant of an ink described herein comprises a chemical species having the structure of Formula (IV):

(IV)

wherein $R_1$, $R_3$, $R_4$, $R_5$, $R_6$, $R_7$, $R_8$, and X are as described above. For example, in some cases $R_1$ is —$(CH_2)_6$—; $R_3$ is —$(CH_2)_4$; $R_5$ is —H; $R_6$, $R_7$, and $R_8$ are each 1 to 10 repeating units of ethylene oxide or propylene oxide bonded to a methylene group or ethylene group; and X is —OC(O)—.

A gellant of an ink described herein can also comprise the reaction product of an alkyl isocyanate having 2-36 carbon atoms in its alkyl chain and a hydroxyalkyl(meth)acrylate having 2-18 or 2-8 carbon atoms in its alkyl chain. The alkyl chain of one or both of the alkyl isocyanate and the hydroxyalkyl(meth)acrylate, in some embodiments, is linear. In other cases, at least one alkyl chain is branched. For example, in some instances, the alkyl isocyanate comprises dodecyl isocyanate, tridecyl isocyanate, tetradecyl isocyanate, pentadecyl isocyanate, hexadecyl isocyanate, heptadecyl isocyanate, octadecyl isocyanate, nonadecyl isocyanate, eicosyl isocyanate, or a combination thereof. Further, in some embodiments, the hydroxyl group of a hydroxyalkyl (meth)acrylate comprises a primary alcohol. In other instances, the hydroxyl group comprises a secondary alcohol. In some cases, a hydroxyalkyl(meth)acrylate comprises hydroxyethyl acrylate, hydroxyethyl methacrylate, hydroxypropyl acrylate, hydroxypropyl methacrylate, hydroxybutyl acrylate, hydroxybutyl methacrylate, or a combination thereof. A hydroxyalkyl(meth)acrylate can also comprise a hydroxypentyl, hydroxyhexyl, hydroxyheptyl, hydroxyoctyl, hydroxynonyl, or hydroxydecyl(meth)acrylate.

Additionally, a gellant of an ink described herein can also comprise the reaction product of an isocyanatoalkyl(meth)acrylate having 2-18 carbon atoms in its alkyl chain and a fatty alcohol having 4-36 carbon atoms in its alkyl chain. For example, in some embodiments, an isocyanatoalkyl(meth)acrylate comprises 2-isocyanatoethyl acrylate, 2-isocyanatoethyl methacrylate, 3-isocyanatopropyl acrylate, 3-isocyanatopropyl methacrylate, 4-isocyanatobutyl acrylate, 4-isocyanatobutyl methacrylate, or a combination thereof. A fatty alcohol, in some cases, comprises caproyl alcohol, pelargonic alcohol, capric alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, arachidyl alcohol, heneicosyl alcohol, behenyl alcohol, lignoceryl alcohol, ceryl alcohol, montanyl alcohol, or a combination thereof.

Moreover, in some embodiments, a gellant of an ink described herein comprises the reaction product of an alkyl isocyanate having 2-36 carbon atoms in its alkyl chain and an aminoalkyl(meth)acrylate having 2-18 carbon atoms in its alkyl chain. The alkyl chain of one or both of the alkyl isocyanate and the aminoalkyl(meth)acrylate, in some embodiments, is linear. In other embodiments, at least one alkyl chain is branched. For example, in some instances, the alkyl isocyanate comprises dodecyl isocyanate, tridecyl isocyanate, tetradecyl isocyanate, pentadecyl isocyanate, hexadecyl isocyanate, heptadecyl isocyanate, octadecyl isocyanate, nonadecyl isocyanate, eicosyl isocyanate, or a combination thereof. Further, in some embodiments, the amino group of an aminoalkyl(meth)acrylate comprises a primary amine. In other embodiments, the amino group comprises a secondary amine. In some embodiments, an aminoalkyl(meth)acrylate comprises aminoethyl(meth)acrylate, aminopropyl(meth)acrylate, aminobutyl(meth)acrylate, or a combination thereof.

In still other embodiments, a gellant of an ink described herein comprises the reaction product of an isocyanatoalkyl (meth)acrylate having 2-18 carbon atoms in its alkyl chain and a fatty amine having 4-36 carbon atoms in its alkyl chain. For example, in some embodiments, an isocyanatoalkyl(meth)acrylate comprises 2-isocyanatoethyl acrylate, 2-isocyanatoethyl methacrylate, 3-isocyanatopropyl acrylate, 3-isocyanatopropyl methacrylate, 4-isocyanatobutyl acrylate, 4-isocyanatobutyl methacrylate, or a combination thereof. A fatty amine, in some embodiments, comprises a linear 1-alkylamine. In some embodiments, a fatty amine comprises a hexylamine, heptylamine, octylamine, nonylamine, decylamine, undecylamine, dodecylamine, tridecylamine, tetradecylamine, pentadecylamine, hexadecylamine, heptadecylamine, octadecylamine, nonadecylamine, or eicosylamine.

In some embodiments, a gellant of an ink described herein comprises a chemical species of Formula (V):

(V)

wherein x is an integer from 0 to 34, y is an integer from 1 to 17, and $R_4$ is H or $CH_3$. In some embodiments, x is an integer from 8 to 20 or from 10 to 16. In some embodiments, y is integer from 1 to 6 or from 1 to 4.

In other instances, a gellant of an ink described herein comprises a chemical species of Formula (VI):

(VI)

wherein x is an integer from 0 to 34, y is an integer from 1 to 17, and $R_4$ is H or $CH_3$. In some embodiments, x is an integer from 8 to 20 or from 10 to 16. In some embodiments, y is integer from 1 to 6 or from 1 to 4.

In still other cases, a gellant of an ink described herein comprises a chemical species of Formula (VII):

(VII)

wherein x is an integer from 0 to 34, y is an integer from 1 to 17, and $R_4$ is H or $CH_3$. In some cases, x is an integer from 8 to 20 or from 10 to 16. In some embodiments, y is integer from 1 to 6 or from 1 to 4.

Moreover, a gellant having a structure described herein, in some embodiments, has a melting point centered between about 45° C. and about 95° C., between about 50° C. and about 90° C., between about 50° C. and about 80° C., between about 55° C. and about 75° C., between about 60° C. and about 90° C., between about 60° C. and about 75° C., or between about 65° C. and about 95° C.

A gellant described herein can be present in an ink in any amount not inconsistent with the objectives of the present disclosure. In some cases, for example, a gellant is present in the ink in an amount of about 2-25 weight % or 2-20 weight %, based on the total weight of the ink. In other cases, the gellant is present in the ink in an amount of about 3-10 weight %, about 3-9 weight %, about 5-20 weight %, about 5-10 weight %, about 10-25 weight %, or about 10-20 weight %, based on the total weight of the ink.

An ink described herein can also comprise a colorant. The colorant of an ink described herein can be a particulate colorant, such as a particulate pigment, or a molecular colorant, such as a molecular dye. Any such particulate or molecular colorant not inconsistent with the objectives of the present disclosure may be used. In some cases, for instance, the colorant of an ink comprises an inorganic pigment, such as $TiO_2$ and/or ZnO. In some embodiments, the colorant of an ink comprises a colorant for use in a RGB, sRGB, CMY, CMYK, L*a*b*, or Pantone® colorization scheme. Moreover, a particulate colorant of an ink described herein, in some cases, does not "settle" or otherwise phase segregate from other ink components during storage or non-use of the ink.

In addition, inks described herein, in some embodiments, further comprise one or more additives. In some embodiments, an ink described herein further comprises one or more additives selected from the group consisting of photoinitiators, inhibitors, stabilizing agents, sensitizers, and combinations thereof. For example, in some cases, an ink further comprises one or more photoinitiators. Any photoinitiator not inconsistent with the objectives of the present disclosure can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 400 nm or between about 300 nm and about 385 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Suitable photoinitiators can also comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, suitable photoinitiators comprise those operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some instances, comprises ionic dye-counter ion compounds capable of absorbing actinic radiation and generating free radicals for polymerization initiation. In some embodiments, inks containing ionic dye-counter ion compounds can be cured more variably with visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530; and 4,772,541.

A photoinitiator can be present in an ink described herein in any amount not inconsistent with the objectives of the present disclosure. In some embodiments, a photoinitiator is present in an ink in an amount of up to about 5 weight %, based on the total weight of the ink. In some cases, a photoinitiator is present in an amount ranging from about 0.1 weight % to about 5 weight %.

Moreover, in some embodiments, an ink described herein further comprises one or more sensitizers. A sensitizer can be added to an ink to increase the effectiveness of one or more photoinitiators that may also be present. Any sensitizer not inconsistent with the objectives of the present disclosure may be used. In some cases, a sensitizer comprises isopropylthioxanthone (ITX) or 2-chlorothioxanthone (CTX).

A sensitizer can be present in an ink in any amount not inconsistent with the objectives of the present disclosure. In some embodiments, a sensitizer is present in an amount ranging from about 0.1 weight % to about 2 weight % or from about 0.5 weight % to about 1 weight %, based on the total weight of the ink.

In addition, an ink described herein, in some embodiments, further comprises one or more polymerization inhibitors or stabilizing agents. A polymerization inhibitor can be added to an ink to provide additional thermal stability to the composition. Any polymerization inhibitor not inconsistent with the objectives of the present disclosure may be used. In some cases, a polymerization inhibitor comprises methoxyhydroquinone (MEHQ). A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT), which can also be used as a polymerization inhibitor in some embodiments described herein.

A polymerization inhibitor and/or a stabilizing agent can be present in an ink in any amount not inconsistent with the objectives of the present disclosure. In some embodiments, a polymerization inhibitor is present in an amount ranging from about 0.1 weight % to about 2 weight % or from about 0.5 weight % to about 1 weight %. Similarly, in some cases, a stabilizing agent is present in an ink in an amount ranging from about 0.1 weight % to about 5 weight %, from about 0.5 weight % to about 4 weight %, or from about 1 weight % to about 3 weight %, based on the total weight of the ink.

Inks described herein can exhibit a variety of desirable properties, in addition to those described hereinabove, both before and after curing. An ink in a cured state, in some embodiments, comprises an ink that includes a curable material or polymerizable component that has been at least partially polymerized and/or cross-linked. For instance, in some cases, a cured ink is at least about 10% polymerized or cross-linked or at least about 30% polymerized or cross-linked. In some embodiments, a cured ink is at least about 50%, at least about 70%, at least about 80%, or at least about 90% polymerized or cross-linked. In some instances, a cured ink is between about 10% and about 99% polymerized or cross-linked. Similarly, an uncured ink or an ink in an uncured state can be an ink that has not been cured as described herein. Thus, in some embodiments, an uncured ink can be less than 10% polymerized or cross-linked, less than 5% polymerized or cross-linked, less than 3% polymerized or cross-linked, or less than 1% polymerized or cross-linked.

A cured ink described herein, in some cases, exhibits no phase segregation or substantially no phase segregation of components of the ink. For example, in some cases, an ink when cured comprises less than about 10 weight % extractables, based on the total weight of the ink. In some embodiments, the cured ink comprises less than about 5 weight %, less than about 3 weight %, less than about 2 weight %, or less than about 1 weight % extractables, when measured as described hereinbelow.

Additionally, a cured ink described herein, in some cases, has an elongation at break of about 5% to about 40%, about 5% to about 25%, or about 5% to about 20%, when measured according to ASTM D638. Further, a cured ink described herein, in some instances, can have a tensile strength of about 35-55 MPa or about 40-50 MPa, when measured according to ASTM D638. In some embodiments, a cured ink has a tensile modulus of about 1300-2800 MPa or about 1500-2500 MPa, when measured according to ASTM D638. Moreover, in some cases, an ink described herein, when cured, can exhibit a plurality of the foregoing properties.

Inks described herein can be produced in any manner not inconsistent with the objectives of the present disclosure. In some embodiments, for instance, a method for the preparation of an ink described herein comprises the steps of mixing the components of the ink, melting the mixture, and filtering the molten mixture. Melting the mixture, in some cases, is carried out at a temperature of about 75° C. or in a range from about 75° C. to about 85° C. In some embodiments, an ink described herein is produced by placing all components of the ink in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting or extrusion. The filtered mixture can then be cooled to ambient temperatures and stored until ready for use in a 3D printing system.

II. Methods of Printing a 3D Article

In another aspect, methods of printing a 3D article or object are described herein. In some embodiments, a method of printing a 3D article comprises selectively depositing layers of an ink described herein in a fluid state onto a substrate. Any ink described hereinabove in Section I may be used. For example, in some cases, the ink comprises a curable material and a gellant, wherein the gellant comprises a chemical species having one or more terminal olefin moieties linked to a hydrophobic segment by one or more urethane moieties. Further, the layers of an ink can be deposited according to an image of the 3D article in a computer readable format. In some embodiments, the ink is deposited according to preselected computer aided design (CAD) parameters.

Moreover, in some cases, one or more layers of an ink described herein has a thickness of about 0.03 to about 5 mm, about 0.03 to about 3 mm, about 0.03 to about 1 mm, about 0.03 to about 0.5 mm, about 0.03 to about 0.3 mm, about 0.03 to about 0.2 mm, about 0.05 to about 5 mm, about 0.05 to about 1 mm, about 0.05 to about 0.5 mm, about 0.05 to about 0.3 mm, or about 0.05 to about 0.2 mm. Other thicknesses are also possible.

Further, in some cases, the substrate of a method described herein comprises a build pad of a 3D printing system. In other instances, the substrate comprises a previously deposited layer of a build material or ink, or of a support material.

In addition, in some embodiments, a method described herein further comprises supporting at least one of the layers of the ink with a support material. Any support material not inconsistent with the objectives of the present disclosure may be used. In some cases, supporting at least one of the layers of the ink with a support material comprising supporting an "overhanging" portion of the 3D article. Further, in some instances, forming a 3D article from an ink described herein obviates the need to use a support material for "damming" or "encapsulation" during the printing process.

A method described herein can also comprise curing the layers of the ink. In some embodiments, a method of printing a 3D article further comprises subjecting the ink to electromagnetic radiation of sufficient wavelength and intensity to cure the ink, where curing can comprise polymerizing one or more polymerizable functional groups of one or more components of the ink. A layer of deposited ink, in some instances, is cured prior to the deposition of another or adjacent layer of ink.

In some embodiments, a preselected amount of ink described herein is heated to the appropriate temperature and jetted through the print head or a plurality of print heads of a suitable inkjet printer to form a layer on a print pad or printing substrate, including a substrate in a print chamber. In some cases, each layer of ink is deposited according to preselected CAD parameters. A suitable print head to deposit the ink, in some embodiments, is the piezoelectric Z850 print head. Additional suitable print heads for the deposition of ink and support material described herein are commercially available from a variety of ink jet printing apparatus manufacturers. For example, the Xerox print head or Ricoh print heads may also be used.

As an alternative to jetting an ink described herein, it is also possible to selectively deposit the ink onto a substrate or printing surface by extruding the ink, including through relatively large orifices. Extruding an ink described herein, as opposed to jetting the ink, can permit the use of larger sized particulate colorants in the ink without clogging the printing orifice(s). In some cases, an ink described herein can be selectively deposited by extruding the ink through an orifice or nozzle having a diameter of at least about 0.2 mm, at least about 0.3 mm, at least about 0.4 mm, at least about 0.5 mm, or at least about 0.8 mm. In some embodiments, an ink described herein can be extruded through an orifice or nozzle having a diameter between about 0.2 mm and about 1.0 mm, between about 0.25 mm and about 0.8 mm, or between about 0.35 mm and about 0.8 mm. Moreover, extruding an ink described herein in the foregoing manner, in some embodiments, provides a printed article having a high feature resolution.

The "feature resolution" of an article, for reference purposes herein, can be the smallest controllable physical feature size of the article. The feature resolution of an article can be described in terms of a unit of distance such as microns ($\mu m$), or in terms of dots per inch (dpi). As understood by one of ordinary skill in the art, a higher feature resolution corresponds to a higher dpi value but a lower distance value in $\mu m$. In some cases, an article formed by jetting or extruding an ink described herein can have a feature resolution of about 500 $\mu m$ or less, about 200 $\mu m$ or less, about 100 $\mu m$ or less, or about 50 $\mu m$ or less. In some embodiments, an article has a feature resolution between about 50 $\mu m$ and about 500 $\mu m$, between about 50 $\mu m$ and about 200 $\mu m$, between about 50 $\mu m$ and about 100 $\mu m$, or between about 100 $\mu m$ and about 200 $\mu m$. Correspondingly, in some instances, an article described herein has a feature resolution of at least about 100 dpi, at least about 200 dpi, at least about 250 dpi, at least about 400 dpi, or at least about 500 dpi. In some cases, the feature resolution of an article is between about 100 dpi and about 600 dpi, between about 100 dpi and about 250 dpi, or between about 200 dpi and about 600 dpi.

In some embodiments comprising a method of printing a 3D article comprising an ink described herein, the ink remains substantially fluid upon deposition. In other embodiments, the ink exhibits a phase change upon deposition, such as a liquid-gel phase transition. Moreover, in some cases, the temperature of the printing environment can be controlled so that the jetted droplets or extruded portions of ink solidify or become a gel on contact with the receiving surface. In other instances, the jetted droplets or extruded portions of ink do not necessarily solidify or become a gel on contact with the receiving surface, remaining in a substantially fluid state.

Further, in some embodiments, after each layer of ink is deposited, the deposited material is planarized and cured with electromagnetic (e.g., UV) radiation prior to the deposition of the next layer. Optionally, several layers can be deposited before planarization and curing, or multiple layers can be deposited and cured followed by one or more layers being deposited and then planarized without curing. Planarization can correct the thickness of one or more layers prior to curing the material by evening the dispensed material to remove excess material and create a uniformly smooth exposed or flat up-facing surface on the support platform of the printer. In some cases, planarization is accomplished with a wiper device, such as a roller, which may be counter-rotating in one or more printing directions but not counter-rotating in one or more other printing directions. In some embodiments, the wiper device comprises a roller and a wiper that removes excess material from the roller. Additionally, in some cases, the wiper device is heated. It should be noted that the consistency of the jetted or extruded ink described herein prior to curing, in some embodiments, can be sufficient to retain its shape and not be subject to excessive viscous drag from the planarizer. The foregoing process can be continued until a finished 3D article is prepared.

Moreover, a support material, in some embodiments, can be deposited in a manner consistent with that described herein for the ink. The support material, for example, can be deposited according to the preselected CAD parameters such that the support material is adjacent or continuous with one or more layers of the ink. Jetted droplets of the support material, in some embodiments, solidify or freeze on contact with the receiving surface. In other instances, the deposited support material is also subjected to planarization.

Layered deposition of the ink and support material can be repeated until the 3D article has been formed. Moreover, in some embodiments, a method of printing a 3D article further comprises removing the support material from the ink.

Further, in some cases, the ink used to form one or more layers of a printed 3D article in a manner described hereinabove can be selected based on a desired print speed or deposition rate of the ink. As described herein, it has been discovered that the use of an ink comprising a gellant described herein can enable 3D articles to be printed at high resolution and/or high speed. It has further been discovered that especially desirable results can be obtained by combining an ink having a selected gelation rate or gelation time with a selected print speed or deposition rate. Additionally, in some embodiments, particularly desirable results may be obtained by combining a selected printing speed or deposition rate with an ink having a selected gelation time or rate at a selected temperature and/or having a selected liquid-gel transition temperature. For example, in some cases, an ink described herein having a relatively long gelation time (or relatively slow gelation rate) is selected for use in a printing process having a relatively slow printing speed or deposition rate. Similarly, an ink described herein having a relatively short gelation time (or relatively fast gelation rate) can be selected for use in a printing process having a relatively fast printing speed or deposition rate.

In some instances, a method of printing a 3D article described herein comprises jetting an ink described herein at a temperature T1 onto a substrate at a temperature T2 to form a layer of the ink on the substrate, and curing the layer of the ink, wherein T1 is greater than T2, and wherein the ink in an uncured state has a liquid-gel transition temperature below T1 and above T2. Further, in some cases, the layer of the ink is deposited on the substrate at a rate R1 that is within 60% of a gelation rate R2 of the ink in an uncured state at T2. Further, in some cases, R1 is within 50% or within 40% of R2. In some embodiments, the difference between R1 and R2 is in a range of 10-60%, 10-50%, or 10-40%. In some instances, the difference between R1 and R2 is in a range of 20-60%, 20-50%, 20-40%, 30-60%, 30-50%, or 30-40%. It is to be understood that the foregoing percentages are based on the larger of R1 and R2 in any given instance. Moreover, the rate R1 is expressed in units of mg of ink deposited per second per square inch of substrate onto which the ink is deposited ($mg/s/in^2$). As understood by one of ordinary skill in the art, such a deposition rate can be independent of the use of a specific printhead or other deposition apparatus or orifice. Additionally, when an inkjet-type printhead or array of printheads is used, it is further to be understood that the average deposition rate R1 in mg/s/in$^2$ can be determined based on the number of printheads used and the per droplet volume (or per droplet mass) and droplet dispensing frequency of the printheads. Thus, for instance, a deposition rate for an array of n printheads each having a droplet dispensing frequency of f and a per droplet mass of m may be determining by multiplying these factors (in the appropriate units) to obtain a product (n×f×m) in mg/s for a square inch.

The rate R2 is expressed in units of inverse minutes, obtained by taking the inverse of the ink's gelation time (GT) and multiplying by 100. The gelation time of an ink is determined as follows. First, 15 g of the ink is placed in a glass jar and heated in an oven at 80-90° C. to obtain a homogeneous liquid. Next, the glass jar containing the ink is removed from the oven and cooled to room temperature (25° C.). During the cooling process, the gelation of the ink is monitored. The gelation time is the time point at which the ink becomes non-flowable, as determined by turning the glass jar upside down and observing no flow of the gel for at least 3 seconds.

In some cases, GT is between 5 and 14 minutes, between 15 and 30 minutes, between 31 and 45 minutes, between 31 and 60 minutes, or between 46 and 60 minutes. Additionally, in some embodiments of a method described herein, GT of an ink in an uncured state is no greater than about 45 minutes and the layer of the ink is deposited on the substrate at a rate of at least about 1.5 mg/s/in$^2$. In general, the gelation time (GT) or gelation rate (R2) and the printing speed or deposition rate (R1) of an ink according to some embodiments described herein can be selected according to Table I below.

TABLE I

Gelation Times, Gelation Rates, and Deposition Rates.

| Gelation Time (min.) | Gelation Rate (min.$^{-1}$) | Deposition Rate (mg/s/in$^2$) |
|---|---|---|
| 5-14 | 7.1-20 | 6.0-8.0 |
| 10-14 | 7.1-10 | 4.5-6.0 |
| 15-30 | 3.3-6.7 | 2.5-4.0 |
| 15-25 | 4-6.7 | 3.1-4.0 |
| 31-60 | 1.7-3.2 | 1.15-2.0 |
| 31-45 | 2.2-3.2 | 1.5-2.0 |
| 46-90 | 1.11-2.17 | 0.5-1.3 |
| 61-180 | 0.56-1.6 | 0.3-1.2 |
| ≥15 | ≤6.7 | ≤4.0 |
| ≥31 | ≤3.2 | ≤2.0 |
| >45 | <2.2 | <1.5 |
| ≤60 | ≥1.7 | ≥1.15 |
| ≤45 | ≥2.2 | ≥1.5 |
| ≤30 | ≥3.3 | ≥2.5 |
| ≤14 | ≥7.1 | ≥4.5 |

Further, an exemplary calculation of the difference between R1 and R2 can be carried out using Equation (1):

$$100\% \times \frac{|(R1 - R2)|}{(\text{larger of } R1 \text{ and } R2)} \quad (1)$$

Thus, for R1=1.7 mg/s/in$^2$, and R2=2.7 min.$^{-1}$, R1 is within 40% of R2, since $$100\% \times \frac{|(1.7 - 2.7)|}{(2.7)}$$

is equal to 37%.

In addition, the temperature T1 and the temperature T2 of a method described herein can be any temperatures not inconsistent with the objectives of the present disclosure. In some cases, for instance, T1 is a jetting temperature such as 65-95° C., 70-90° C., 70-80° C., or 75-85° C., and T2 is a temperature at or near room temperature. Alternatively, T2 may be an elevated temperature such as might be encountered at the surface of a previously deposited layer of ink that has been previously cured in an exothermic manner. Thus, in some embodiments, T2 is a temperature between about 20° C. and about 30° C. For example, in some cases, T2 is 25° C. In other instances, T2 is greater than 25° C., greater than 30° C., or greater than 45° C. In some embodiments, T2 is 30-40° C., 35-45° C., or 50-70° C.

III. Printed 3D Articles

In another aspect, printed 3D articles are described herein. In some embodiments, a printed 3D article is formed from an ink described herein. Any ink described hereinabove in Section I or Section II may be used. For example, in some cases, the ink comprises a curable material and a gellant, wherein the gellant comprises a chemical species having one or more terminal olefin moieties linked to a hydrophobic segment by one or more urethane moieties.

In some embodiments, a printed 3D article comprises a plurality of layers formed from an ink described herein. Moreover, in some instances, at least one layer of the article has a thickness described herein, such as a thickness of about 0.03 to about 5 mm.

Some embodiments described herein are further illustrated in the following non-limiting examples.

Example 1

Gellant

A gellant of an ink according to one embodiment described herein was prepared as follows. This gellant is denoted as Gellant 1. First, 62.3 g (0.371 mol) of hexamethylene diisocyanate (Sigma-Aldrich Chemical Co., Milwaukee, Wis.), 100.0 g (0.186 mol) of dimer diol (PRIPOL 2033, Uniqema, New Castle, Del.), and 410 g (0.371 mol) of 1,4-butanediol vinyl ether (Sigma-Aldrich) were charged into a 400 mL beaker equipped with a magnetic stir bar. The beaker was placed in a 110° C. silicone oil bath on a stirring hot plate and stirring was initiated. Three drops of catalyst (Fascat 4202, dibutyltindilaurate, Elf Atochem North America, Inc., Philadelphia, Pa.) were added to the beaker, and the mixture was allowed to react for about 2 hours at 110° C. An analysis of the reaction product by Fourier Transform Infrared Spectroscopy (FT-IR) indicated that all the NCO functionality of the starting material was consumed. Specifically, the FT-IR showed the absence (or disappearance) of a peak at about 2285 cm$^{-1}$ (corresponding to an isocyanate moiety) and the appearance (or increase in magnitude) of peaks at about 1740-1680 cm$^{-1}$ and about 1540-1530 cm$^{-1}$ (corresponding to a urethane moiety). The final urethane-containing product was then poured into an aluminum pan and allowed to cool. The product included a chemical species having the structure of Formula (II) hereinabove, Example 2

Gellant

A gellant of an ink according to one embodiment described herein was prepared as follows. This gellant is denoted as Gellant 2. First, 50.0 g (0.167 mol) of octadecyl isocyanate (Mondor O, Bayer Corp., Pittsburgh, Pa.) and 19.6 g (0.169 mol) of 1,4-butanediol vinyl ether (Sigma-Aldrich) were charged into a 200 mL beaker equipped with a magnetic stir bar. The beaker was then placed in a 110° C. silicone oil bath on a stirring hot plate and stirring was initiated. Two drops of catalyst (Fascat 4202, dibutyltindilaurate, Elf Atochem) were added and the mixture was allowed to react for about 2 hours at 110° C. An FT-IR analysis of the reaction product indicated that all the NCO functionality was consumed, as described above in Example 1. The final urethane-containing product was then poured into an aluminum pan and allowed to cool. This final product was characterized by a viscosity of about 2.63 cP as measured by a Ferranti-Shirley cone-plate viscometer at about 135° C. The product included a chemical species having the structure of Formula (VIII):

(VIII)

Example 3

Gellants

Additional gellants according to some embodiments described herein were prepared as follows. These gellants are denoted as Gellants 3-27.

To provide Gellants 3-27, the identified compounds (A), (B), (B'), (B"), and (C) in Table II were reacted in either a "stepwise" or "simultaneous" manner, as described hereinabove in Section I. In the "stepwise" instance, the isocyanate was generally reacted with the alcohol species first, followed by reaction of the resulting product with the ethylenically unsaturated species. However, the opposite order could also be used, in which the isocyanate was first reacted with the ethylenically unsaturated species, followed by reaction with the alcohol species. The order used in a specific instance is indicated in Table II (under "Rxn"). In addition, the abbreviations for the reactants used in Table II are provided below. Further, the synthetic protocols for Gellants 3-27 generally corresponded to those described above in Examples 1 and 2. Specifically, Gellants 3-5 were made according to the protocol of Example 1, except with the indicated substitution of reactants. Gellants 7-14, 16, 19, and 22 were made according to the protocol of Example 2, except with the indicated substitution of reactants. Gellants 15, 17, 18, 20, 21, and 23-25 were made according to the protocol of Example 2, except with the indicated substitution of reactants and using a stepwise process rather than a simultaneous process. Gellant 6 was made by first reacting hexamethylene diisocyanate with 1,4-butanediol vinyl ether at 60° C. with stirring in a reaction vessel for approximately 30 min. Next, to the reaction vessel was added a triol having the structure of Formula (IX):

(IX)

wherein (a+b+c)=5 or 6 (obtained from Huntsman Chemical). The temperature was then increased to 80° C. and stirring continued at this temperature for approximately 3 hours to provide the desired product. Gellants 26 and 27 were made by adding octadecyl isocyanate (approx. 300 g) and hydroxybutyl acrylate or hydroxyethyl methacrylate (approx. 150 g), respectively, into a reactor and heating the mixture to a temperature between 75° C. and 85° C. with agitation. The reaction was continued at this temperature for 7-8 hours with agitation.

TABLE II

Reactants for Gellants.

| Gellant | (A) | (A)' | (B) | (B') | (B") | (C) | Rxn |
|---|---|---|---|---|---|---|---|
| 3 | IPDI | — | Dimer | — | — | HBVE | Sim. |
| 4 | HDI | — | Dimer | — | — | HEMA | Sim. |
| 5 | HDI | — | Dimer | — | — | HEA | Sim. |
| 6 | HDI | — | — | — | Triol | HBVE | Step. |
| 7 | HDI | — | — | C8OH | — | HBVE | Sim. |
| 8 | HDI | — | — | C12OH | — | HBVE | Sim. |
| 9 | HDI | — | — | C14OH | — | HBVE | Sim. |
| 10 | HDI | — | — | C16OH | — | HBVE | Sim. |
| 11 | HDI | — | — | C22OH | — | HBVE | Sim. |
| 12 | HDI | — | — | C26OH | — | HBVE | Sim. |
| 13 | HDI | — | — | C32OH | — | HBVE | Sim. |
| 14 | HDI | — | — | C8OH | — | HEMA | Sim. |
| 15 | HDI | — | — | C8OH | — | HEMA | Step., (C) first |
| 16 | HDI | — | — | C10OH | — | HEMA | Sim. |
| 17 | HDI | — | — | C10OH | — | HEMA | Step., (C) first |
| 18 | HDI | — | — | C10OH | — | HEMA | Step., (B') first |
| 19 | HDI | — | — | C12OH | — | HEMA | Sim. |
| 20 | HDI | — | — | C12OH | — | HEMA | Step., (C) first |
| 21 | HDI | — | — | C11OH | — | HEMA | Step., (C) first |
| 22 | HDI | — | — | C8OH, C10OH, C12OH (equal amounts) | — | HEMA | Sim. |
| 23 | HDI | — | — | C8OH | — | HEA | Step., (C) first |
| 24 | HDI | — | — | C10OH | — | HEA | Step., (C) first |
| 25 | HDI | — | — | C12OH | — | HEA | Step., (C) first |
| 26 | — | ODI | — | — | — | HBA | Sim. |
| 27 | — | ODI | — | — | — | HEMA | Sim. |

HDI = hexamethylene diisocyanate;
IPDI = isophorone diisocyanate;
ODI = octadecyl isocyanate;
Dimer = dimer diol, PRIPOL 2033;
Triol = species of Formula (IX) above;
CnOH = linear alkyl monoalcohol having n carbon atoms (such that, e.g., C8OH is 1-octanol); also, for n = 26 and n = 32, the compound (B') was UNILIN 350 and UNILIN 425, respectively;
Iso-CnOH = same as CnOH, except the alkyl chain is an "iso" isomer;
HBVE = 1,4-butanediol vinyl ether (or hydroxybutanevinylether);
HBA = 4-hydroxybutyl acrylate;
HEMA = 2-hydroxyethyl methacrylate;
HEA = 2-hydroxyethyl acrylate;
Sim. = simultaneous reaction of reactants; and
Step. = stepwise reaction of reactants.

Example 4

Inks

Inks according to some embodiments described herein were prepared as follows. Specifically, to prepare various types of inks, the components of Table III were mixed in a reaction vessel. The amounts in Table III refer to the weight % of each component of the ink, based on the total weight of the ink. For each ink, the appropriate mixture was heated to a temperature of about 75-85° C. with stirring. The heating and stirring were continued until the mixture attained a substantially homogenized molten state. The molten mixture was then filtered. Next, the filtered mixture was allowed to cool to ambient temperature.

TABLE III

Ink Components.

|  | Ink 1 | Ink 2 | Ink 3 |
|---|---|---|---|
| Mono(meth)acrylate | 15-30 | 15-30 | 17-25 |
| Diacrylate/Triacrylate | 25-35 | 25-35 | 35-50 |
| Acrylate Oligomer | 10-20 | 8-15 | 5-10 |
| Gellant 1 (Example 1) | 5 | 10 | 16 |
| Photoinitiator | 4-5 | 4-5 | 4-5 |
| Inhibitor | 0.2-0.4 | 0.2-0.4 | 0.2-0.4 |

The dynamic oscillatory shear viscosities of inks corresponding to the formulations of Inks 1 and 2 of Table III were measured using a cone and plate rheometer having a plate diameter of 50 mm, a cone angle of 0.04 radians (rad), and a plastic cone. The viscosities were measured at a frequency of 10 rad/s, a strain amplitude of 80%, and a temperature scan rate of 1.0 K/min. (average thermal tool expansion 1.2 μm/K). Specifically, the temperature was decreased from 80° C. to 30° C., followed by a 2 minute waiting period, and then increased from 30° C. to 80° C., with an additional 2 minute waiting period. There was also a 5 minute waiting period prior to the beginning of the measurement. Results are provided in Table IV.

TABLE IV

Viscosities of Inks (cP).

| Temperature (° C.) | Ink 1 | Ink 2 |
|---|---|---|
| 80.0 (Cooling Scan) | 14.26 | 16.87 |
| 80.0 (Heating Scan) | 14.36 | 16.90 |
| 70.0 (Cooling Scan) | 20.31 | 24.17 |
| 69.9 (Heating Scan) | 20.38 | 24.05 |
| 60.0 (Cooling Scan) | 30.16 | 36.15 |
| 59.9 (Heating Scan) | 30.08 | 36.72 |
| 50.0 (Cooling Scan) | 47.36 | 57.41 |
| 49.9 (Heating Scan) | 67.93 | 405 |
| 40.0 (Cooling Scan) | 80.33 | 98.52 |
| 39.9 (Heating Scan) | 219 | 1011 |
| 30.0 (last reading on Hold) | 158 | 3158 |

In addition, a solvent extraction test was carried out on cured samples of inks corresponding to the formulations of Inks 1 and 2. Specifically, the solvent extraction test was carried out as follows. First, 0.5 g of the test ink was weighed into a 7.5×1.0 cm silicone mold. The ink was then cured for 10 seconds using a Phoseon FE 200 110x10AC395 lamp placed 1.4 cm from the sample at 0.44 Watts power. The cured sample was removed and weighed on an analytical balance to obtain an initial weight. The sample was then submerged in 30 mL of acetone at room temperature for 20 min. Next, the sample was removed, dried at 50° C. under a vacuum of 250 mm Hg for 2 hours, and reweighed to obtain a final weight. Mass loss was calculated by subtracting the final weight from the initial weight. The mass loss, as a percentage of the initial weight, was taken to be the percent of extractables. About 1% extractables was observed for each ink tested.

Figure 1A:
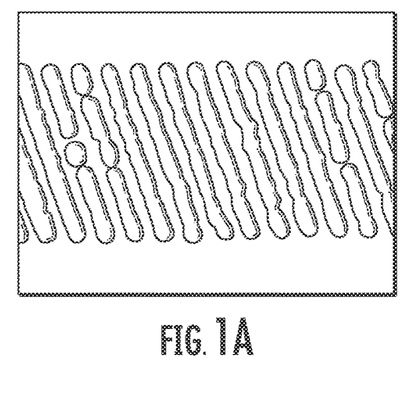
FIGS. 1A and 1B illustrate photographs of a comparative ink deposited on a substrate.
Figure 1B:
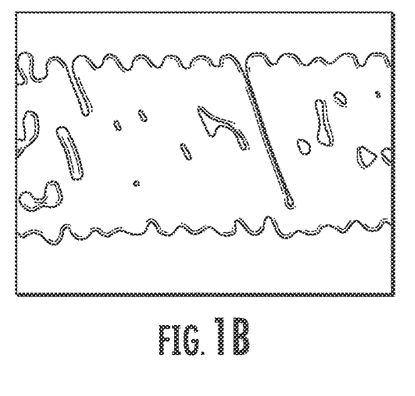
Figure 1C:
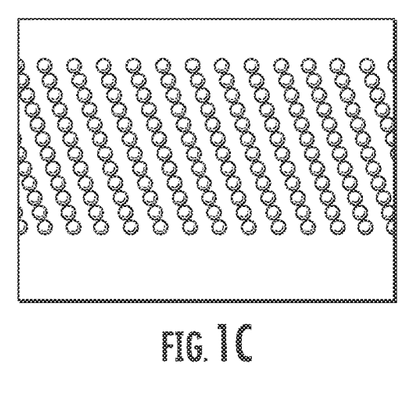
FIGS. 1C and 1D illustrate photographs of an ink according to one embodiment described herein deposited on a substrate.
Figure 1D:
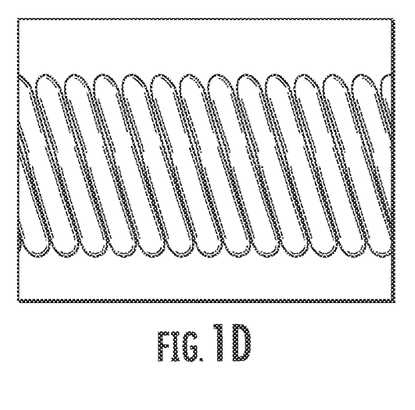

Further, a printing test was carried out on a printhead test ("strobe") stand to evaluate the gelling speed of small droplets of an ink corresponding to the formulation of Ink 3. Specifically, a sample of Ink 3 was placed in a Xerox print head on the strobe stand and jetting parameters were optimized until stable jetting performance was observed. Subsequently, pieces of clear polyester film were placed under the jetstack, and differing numbers of droplets were "piled" onto the surface of the plastic film underneath each orifice. Neither the jetstack nor the plastic was moved during the test. Thus, a pool of ink formed under each nozzle, with the resulting image mimicking the orifice layout of the print head. A series of tests were carried out, with each subsequent run increasing the number of droplets ejected until pooling of the image began to be observed. In particular, runs of 250, 500, 1000, and 5000 droplets per orifice were carried out. The same test was repeated with a comparative ink not including the gellant. In the comparative ink, some components were altered from Ink 3 to maintain the appropriate jetting viscosity. The results are illustrated in FIG. 1. Specifically, FIGS. 1A and 1B illustrate photographs of the surface of the plastic film at 1000 drops per orifice and 5000 drops per orifice, respectively, for the comparative ink. FIGS. 1C and 1D illustrate photographs of the surface of the plastic film at 1000 drops per orifice and 5000 drops per orifice, respectively, for Ink 3. As illustrated in FIG. 1, Ink 3 provided much more cleanly defined structures.

Figure 2A:
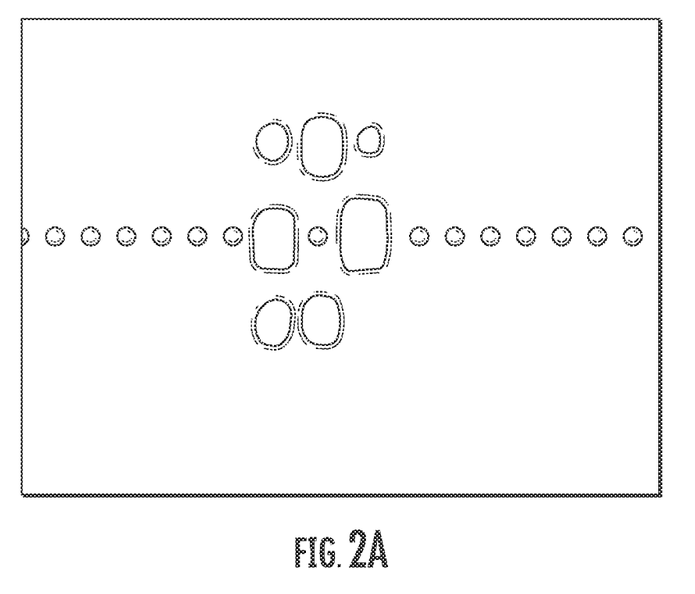
FIG. 2A illustrates a photograph of a printed 3D article formed from a comparative ink.
Figure 2B:
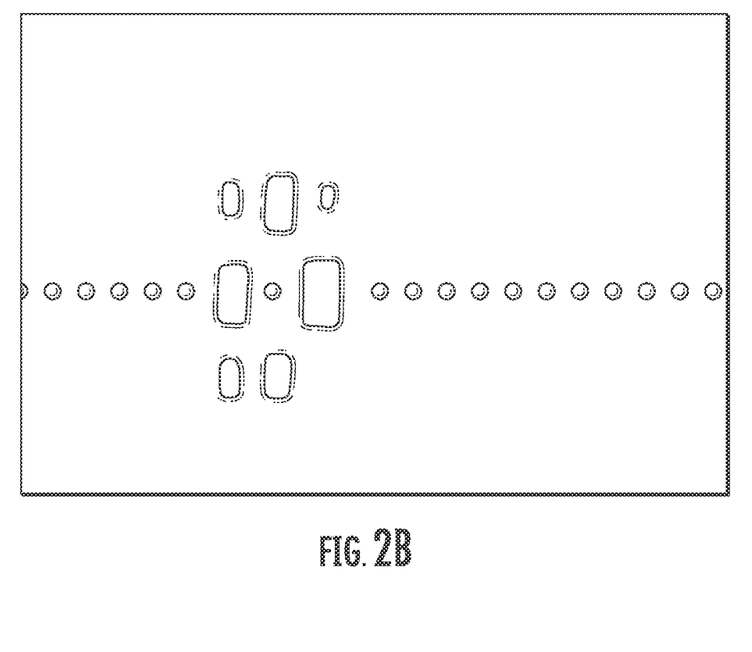
FIG. 2B illustrates a photograph of a printed 3D article formed from an ink according to one embodiment described herein.

As a further comparison, Ink 3 and the comparative ink were also used to print 3D test parts. FIG. 2A illustrates a photograph of the test part formed from the comparative ink. FIG. 2B illustrates a photograph of the test part formed from Ink 3. As illustrated in FIG. 2, Ink 3 provided a test part having improved part resolution compared to the comparative ink. The test parts were "heat diagnostic" structures, and the openings on the structures were intended to be rectangles having sharp corners. In addition, the test part formed from Ink 3 was printed without the need for "encapsulation" or "damming" with the support material. In contrast, encapsulation and damming were needed for formation of the test part with the comparative ink.

Initial mechanical properties of printed and cured "dog bones" formed from Ink 3 were also measured. The dog bones exhibited an elongation at break of 12%, a tensile strength of 6800 psi, and a tensile modulus of 290 ksi.

Example 5

Inks

Additional inks according to some embodiments described herein were prepared in the same manner as described above in Example 4 for Ink 1, except Gellant 1 of Example 1 was replaced with the some gellants from Example 3 in the amounts indicated in Table V below. The weight percents in Table V are weight percents of the gellant based on the total weight of the ink. Additionally, Table VI below provides the gelation times and gelation onset temperatures for some of the inks listed in Table V. The gelation times were determined as described above in Section II. The gelation onset temperatures were determined by cooling the inks from 80-90° C. at 1° C. per minute and noting the temperature at which gelation began, based on the first point in the viscosity versus temperature curve at which a large change or "step" in viscosity began, where the viscosity was measured as generally described in Example 4 above.

TABLE V

| Inks. | | |
|---|---|---|
| Ink | Gellant | Wt. % Gellant |
| 4 | 7 | 8 |
| 5 | 7 | 15 |
| 6 | 8 | 5 |
| 7 | 8 | 8 |
| 8 | 8 | 15 |
| 9 | 9 | 5 |
| 10 | 9 | 8 |
| 11 | 9 | 15 |
| 12 | 10 | 2 |
| 13 | 10 | 3.5 |
| 14 | 10 | 5 |
| 15 | 10 | 8 |
| 16 | 10 | 15 |
| 17 | 11 | 2 |
| 18 | 11 | 8 |
| 19 | 12 | 8 |
| 20 | 13 | 8 |
| 21 | 14 | 5 |
| 22 | 14 | 8 |
| 23 | 15 | 5 |
| 24 | 15 | 8 |
| 25 | 16 | 5 |
| 26 | 16 | 8 |
| 27 | 17 | 5 |
| 28 | 17 | 8 |
| 29 | 18 | 5 |
| 30 | 18 | 8 |
| 31 | 19 | 5 |
| 32 | 19 | 8 |
| 33 | 20 | 5 |
| 34 | 20 | 8 |
| 35 | 21 | 5 |
| 36 | 21 | 8 |
| 37 | 22 | 5 |
| 38 | 22 | 8 |
| 39 | 26 | 9 |
| 40 | 27 | 6 |
| 41 | 27 | 9 |

TABLE VI

| Gelation Times and Gelation Onset Temperatures. | | |
|---|---|---|
| Ink | Gelation Time (min.) | Gelation Onset Temperature (° C.) |
| 21 | 19 | 62 |
| 22 | 18 | 51.4 |
| 25 | 34 | 52 |
| 26 | 23 | — |
| 31 | 24 | 35 |
| 32 | 17 | — |
| 39 | 46 | 33 |
| 40 | 56 | 29 |
| 41 | 37 | 33 |

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A method of printing a three-dimensional article comprising:
    jetting an ink at a temperature T1 onto a substrate at a temperature T2 to form a layer of the ink on the substrate; and
    curing the layer of the ink,
    wherein T1 is greater than T2;
    wherein the ink in an uncured state has a liquid-gel transition temperature below T1 and above T2;
    wherein the ink comprises a curable material and a gellant, the gellant comprising a chemical species having one or more terminal olefin moieties linked to a hydrophobic segment by one or more urethane, urea, and/or amide moieties; and
    wherein the layer of the ink is deposited on the substrate at a rate R1 in mg/s/in² that is within 60% of a gelation rate R2 of the ink in inverse minutes in an uncured state at T2, the percentage being based on the larger of R1 and R2.

2. The method of claim 1, wherein a difference between R1 and R2 is 20-60% of the larger of R1 and R2.

3. The method of claim 1, wherein a difference between R1 and R2 is 30-50% of the larger of R1 and R2.

4. The method of claim 1, wherein a gelation rate GT of the ink in an uncured state at T2 is between 15 and 30 minutes.

5. The method of claim 1, wherein a gelation rate GT of the ink in an uncured state at T2 is between 31 and 45 minutes.

6. The method of claim 1, wherein T1 is 70-90° C. and T2 is 20-30° C.

7. The method of claim 1, wherein T2 is 35-45° C.

8. The method of claim 1, wherein the curable material comprises one or more oligomeric materials and wherein the one or more oligomeric materials comprises a urethane (meth)acrylate.

9. The method of claim 1, wherein the curable material is present in the ink in an amount of about 50-98 weight % and wherein the gellant is present in the ink in an amount of about 2-20 weight %, based on the total weight of the ink.

10. The method of claim 1, wherein the gellant is formed from the reaction of compound (A) with compound (B) and compound (C):

wherein $R_1$, $R_2$, and $R_3$ are each independently a linear or branched alkyl, aryl, alkylaryl, or arylalkyl moiety having from 1 to 50 carbon atoms;
$R_4$ is —H or $CH_3$; and
X is —O—, —$OCH_2$—, —OC(O)—, or —$CH_2$—.

11. The method of claim 1, wherein the gellant comprises a chemical species having the structure of Formula (I):

(I)

wherein $R_1$, $R_2$, and $R_3$ are each independently a linear or branched alkyl, aryl, alkylaryl, or arylalkyl moiety having from 1 to 30 carbon atoms;

$R_4$ is —H or $CH_3$;

X is —O—, —$OCH_2$—, —OC(O)—, or —$CH_2$—; and

⌇ represents a single carbon-carbon bond between the $R_2$ moieties.

12. The method of claim 1, wherein the gellant comprises a chemical species having the structure of Formula (II):

(II)

13. The method of claim 1, wherein the gellant is formed from the reaction of compound (A) or (A') with compound (B) or (B') and compound (C) or (C'):

OCN—$R_1$—NCO,  (A)

$R_1$—NCO,  (A')

HO—$R_2$—OH,  (B)

$R_2$—OH,  (B')

, and  (C)

,  (C')

wherein $R_1$, $R_2$, and $R_3$ are each independently a linear or branched alkyl, aryl, alkylaryl, or arylalkyl moiety having from 1 to 50 carbon atoms;

$R_4$ is —H or —$CH_3$; and

X is —O—, —$OCH_2$—, —OC(O)—, or —$CH_2$—.

14. The method of claim 1, wherein the gellant comprises a chemical species having the structure of Formula (III):

(III)

wherein $R_1$, $R_2$, and $R_3$ are each independently a linear or branched alkyl, aryl, alkylaryl, or arylalkyl moiety having from 1 to 50 carbon atoms;

$R_4$ is —H or —$CH_3$; and

X is —O—, —$OCH_2$—, —OC(O)—, or —$CH_2$—.

15. The method of claim 1, wherein the gellant comprises a chemical species of Formula (VI):

(VI)

wherein x is an integer from 0 to 34;

y is an integer from 1 to 17; and $R_4$ is H or $CH_3$.

16. The method of claim 1, wherein the gellant comprises a chemical species of Formula (VII):

(VII)

wherein x is an integer from 0 to 34;

y is an integer from 1 to 17; and

R is H or $CH_3$.

17. The method of claim 1, wherein the ink exhibits a liquid-gel transition between about 30° C. and about 75° C.

18. The method of claim 1, wherein the ink has an optical transparency of at least about 90% transmission between about 350 nm and about 750 nm, at a thickness of about 0.03 to 5 mm.

19. The method of claim 1, wherein a plurality of layers of the ink are deposited on the substrate according to an image of the three-dimensional article in a computer readable format.

* * * * *

UNITED STATES PATENT AND TRADEMARK OFFICE
CERTIFICATE OF CORRECTION

PATENT NO.       : 9,732,241 B2                      Page 1 of 1
APPLICATION NO.  : 14/730841
DATED            : August 15, 2017
INVENTOR(S)      : Don Titterington et al.

It is certified that error appears in the above-identified patent and that said Letters Patent is hereby corrected as shown below:

In the Claims

Claim 4, Column 30, Line 30, please delete "gelation rate GT" and replace with --gelation time GT--; and Claim 5, Column 30, Line 33, please delete "gelation rate GT" and replace with --gelation time GT--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*